Patented Jan. 7, 1936

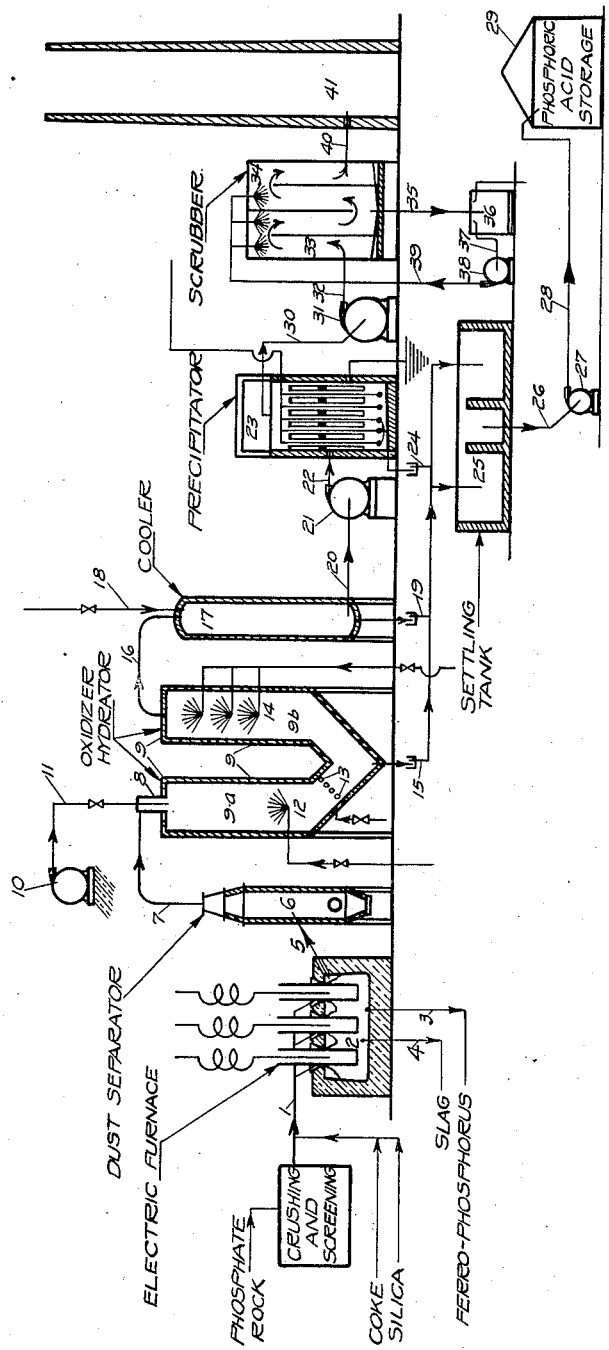

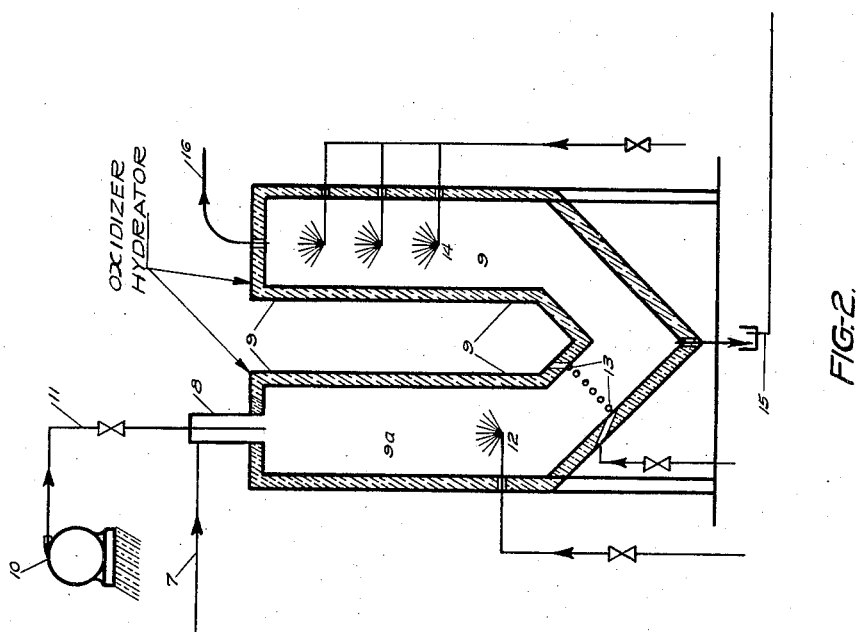

2,026,519

UNITED STATES PATENT OFFICE 2,026,519

APPARATUS FOR MAKING PHOSPHORIC ACID

Harry A. Curtis, Knoxville, Tenn., assignor to Tennessee Valley Authority, Wilson Dam, Ala., a corporation Application May 15, 1935, Serial No. 21,564

5 Claims. (Cl. 23—262)

(Granted under the act of March 3, 1883, as amended April 30, 1928; 370 O. G. 757)

This application is made under the act of April 30, 1928, and the invention herein described, if patented, may be manufactured and used by and for the Government for governmental purposes without the payment to me of any royalty thereon.

This invention relates to an improvement in the apparatus for the production of phosphoric acid by thermal methods, particularly the apparatus for the oxidation and hydration of the phosphorus in phosphorus reduction furnace vapors, or phosphorus separated from such vapors.

One of the objects of this invention is to develop and improve the apparatus for the production of phosphoric acid. Another object of this invention is to prevent the collection and necessity for disposal of the viscous partially hydrated phosphorus pentoxide which is produced by the reaction with the water contained in the air admitted for the combustion of gaseous products from phosphate reduction furnace. Another object of this invention is to provide for the cooling of the above-mentioned combustion products immediately after their formation and prior to the hydration of the remainder of the phosphorus pentoxide present. Another object of this invention is to provide an apparatus for the oxidation of elemental phosphorus which has been separated from the gases produced in a phosphate reduction furnace of either the electric or thermal type. Still another object of this invention is to provide a vapor of suitable properties for treatment in an electrical precipitator for the removal of phosphoric acid mist. Other objects of this invention include the provision for an economical oxidizer-hydrator structure for use in the manufacture of phosphate fertilizers for soil conservation.

The electric furnace method for the production of phosphoric acid involves the reduction of a charge of phosphate rock, silica, and coke to produce slag, ferro-phosphorus and a mixture of carbon monoxide and elemental phosphorus, the oxidation of the carbon monoxide and phosphorus in the mixture to carbon dioxide and phosphorus pentoxide, respectively, the hydration of the phosphorus pentoxide to phosphoric acid, and the separation of the phosphoric acid mist from the gaseous mixture containing the same. The blast furnace method for the production of phosphoric acid involves the reduction of a charge of phosphate rock, silica and coke to produce slag, ferro-phosphorus and a mixture of carbon monoxide, nitrogen and elemental phosphorus, the separation of the elemental phosphorus from the carbon monoxide and nitrogen, the oxidation of the elemental phosphorus to phosphorus pentoxide, the hydration of phosphorus pentoxide to phosphoric acid, and the separation of the phosphoric acid mist from the gaseous mixture containing the same.

The design, construction and operation of two units of apparatus for the production of phosphoric acid by the electric furnace method disclosed the unsatisfactory solution of certain problems relating to the oxidation of the elemental phosphorus in electric furnace gases and the hydration of the resulting phosphorus pentoxide even though these units were constructed so as to incorporate certain of those features which were considered to be the same as or improvements in the prior disclosures in these respects.

I have found that, by the construction and operation of a combined oxidizer-hydrator section of apparatus of approximately U-shaped vertical section in which the combustion of the gaseous mixture, partial hydration and cooling of the combustion products takes place in one column and in which the remainder of the hydration takes place in the other column, a satisfactory control and disposition of the viscous partially hydrated phosphorus oxides may be obtained, a more satisfactory control hydration of the remaining phosphorus oxides results and a combined unit of apparatus for the manufacture of phosphoric acid, which includes this U-shaped oxidizer-hydrator, operates more satisfactorily for the production of phosphoric acid. Also I have found this combined oxidizer-hydrator to be effective for the oxidation of elemental phosphorus, which has been separated from phosphate reduction furnace gases, and the subsequent hydration of the phosphorus pentoxide formed.

In the acompanying drawings, which form a part of this specification, and wherein reference symbols refer to like parts whenever they occur, Fig. 1 is a diagrammatic vertical sectional view of one form of apparatus for the production of phosphoric acid embodying my invention;

Fig. 2 is an enlarged diagrammatic vertical sectional view of the oxidizer-hydrator section of the apparatus shown in Fig. 1.

In the construction illustrated in Fig. 1, the charging stock, consisting of the proper proportions of phosphate rock, silica and coke, is delivered by conveyor 1, to electric furnace 2, which is a combined arc and resistance furnace with its operation controlled to maintain constantly the temperature required for the reduction of the phosphate rock in the charge. The ferrophosphorus and slag produced are withdrawn periodically through outlets 3 and 4, respectively, and the vapors produced, comprising principally carbon monoxide and elemental phosphorus, are conducted from the furnace through vapor line 5 to dust separator 6, where a substantial portion of the solid particles entrained with the vapors are removed. The vapors from separator 6, pass through line 7 to burner 8, located in the top of column 9a of the U-shaped oxidizer-hydrator 9, with air supplied to burner 8 by air from blower 10, through valve line 11. The combustion products move downward through column 9a and are cooled partially by finely dispersed particles of water formed by a plurality of spray nozzles, of which nozzle 12 is representative, and partially by admixture with air admitted through valved inlets, of which inlet 13 is representative, located around the bottom of U-shaped chamber 9, adjacent to the bottom of column 9a. A portion of the phosphorus pentoxide in the combination products hydrated by the water contained in the air used for combustion and by the water used for cooling the combustion products separates from the vapors and collects in the bottom of chamber 9. The vapors from column 9a pass upward through column 9b, and contact finely dispersed particles of water formed by a plurality of spray nozzles, of which nozzle 14 is representative. The acid separating from the vapors in column 9b, collects in the bottom of the U-shaped chamber 9, with the acid from column 9a, and with dust particles which have been separated by the spray treatment of the vapors, and the resulting mixture is withdrawn from the bottom of chamber 9, through trapped line 15. Vapors from the top of column 9b pass through line 16, into the top of the vertical cooling chamber 17, and are admixed with air for cooling the vapors to the proper temperature for electrical precipitation, admitted to the top of the cooling chamber through valved line 18. Liquid separating from the vapors in chamber 17 is withdrawn from the bottom of the chamber through trapped line 19, and the vapors pass through line 20, to the intake of blower 21, which discharges through line 22, to the electrical precipitator 23. The acid separated by the electrical precipitator is withdrawn from the bottom of the precipitator through trapped line 24, and passes to settling tank 25, along with the other acid delivered by lines 15 and 19, respectively. The partially purified phosphoric acid is withdrawn from the overflow section of the settling tank through line 26, to the intake of acid pump 27, and discharges through line 28, into phosphoric acid storage tank 29. The vapors from the electrical precipitator 23 pass through line 30, to the intake of blower 31, and discharge through line 32, into scrubber 33, where they are scrubbed with water delivered by a plurality of nozzles, of which nozzle 34 is representative. The aqueous solution withdrawn from the scrubber through line 35 passes through neutralizer 36, which contains limestone, and is circulated through the scrubber by passing through line 37 to the intake of pump 38, discharging through line 39, to the plurality of spray nozzles, including nozzle 34. The vapors from scrubber 33 pass through line 40, and out to the atmosphere through stack 41.

One example of the operation of my invention is given for the production of phosphoric acid from brown phosphate rock containing 33 to 34 per cent $P_2O_5$: Phosphate rock, quartz rock and coke are charged to an electric furnace continuously, in the proportion of 7500 pounds, 2100 pounds and 1240 pounds, respectively, and the operation of the furnace controlled to melt the charge at the bottom of the furnace continuously. The ferro-phosphorus and slag respectively are tapped continuously while the vapors which are evolved continuously pass thru a dust separator to remove the major portion of the fine solid charge which is entrained with the vapors. The vapors are burned with an excess of air and the combustion products cooled to about 400° C. by contacting with a controlled, finely dispersed spray of water and by admixing the minimum amount of air. The hydration of the cooled vapors is completed by contacting them countercurrently with a controlled finely divided spray which results in a further cooling of the vapors to 150 to 200° C. The vapors from the oxidizer-hydrator are further cooled to 125 to 150° C. by admixture with air in the vertical cooling chamber and treated in an electrical precipitator to remove the phosphoric acid mist. The acid collecting at the bottom of the oxidizer-hydrator, vapor cooler and precipitator, respectively, is withdrawn to a settling tank to permit the separation of some of the suspended solid matter and this concentrated phosphoric acid is then utilized in the production of triple superphosphate fertilizers.

Another example of the operation of my invention is given for the production of phosphoric acid from elemental phosphorus separated from phosphate reduction furnace vapors: Liquid phosphorus is fed to the burner of the oxidizer hydrator with an excess of air and the products of combustion are cooled immediately to 400° C. by contacting them with a controlled, finely dispersed spray of water and by admixing the minimum amount of air. The subsequent hydration, cooling and precipitation of the partially cooled combustion products is carried out in the manner described in the first example. It is particularly advantageous to burn the separated elemental phosphorus since either the useful capacity of existing installations designed to burn both phosphorus and carbon monoxide are materially increased or size and cost of new installations are materially reduced.

It is evident that there are numerous factors which will influence conditions for the most satisfactory operation of my invention, the actual limits of which cannot be established except by a detailed study of each set of raw materials and intermediate and finished products involved.

Certain terms used throughout the description and claims are understood to have the following meaning: Phosphate reduction furnace means and includes any electric or fuel-fired furnace in which the phosphatic charge reacts to produce a gaseous mixture containing elemental phosphorus, and the U-shaped chamber for oxidizer-hydrator shall mean and include any enclosed chamber comprising two columns and an intercommunication between the bottom of the columns, with the axes of the columns vertical or equivalent thereto for the purposes specified.

It will therefore be seen that this invention may be actually carried out by the modification of certain details without departing from its spirit or scope.

I claim:

1. An apparatus for making phosphoric acid comprising the combination of an electrical phosphate reduction furnace; a vapor line from outlet of electric furnace to inlet of dust collector; a dust separator; a vapor line from dust separator to burner of oxidizer-hydrator; a combined oxidizer-hydrator comprising an enclosed U-shaped chamber, a burner at top of one column of chamber, means for maintaining aqueous spray thruout the lower portion of said column of chamber, inlets for air in bottom of chamber adjacent to bottom of the first mentioned column, means for maintaining aqueous spray thruout the other column of the chamber; a vapor line from top of last mentioned column of the U-shaped chamber to top of vertical cooling chamber; a vertical cooling chamber with means for admitting air at top; a vapor line from bottom of cooling chamber to inlet of electrical precipitator; an electrical precipitator for separating phosphoric acid mist from vapors; means for propelling vapors thru the dust separator, the oxidizer-hydrator, the vapor cooler and the precipitator so that a pressure, substantially equal to the prevailing atmospheric pressure, is maintained at the vapor outlet of the furnace; and means for withdrawing liquid separating at the bottom of the oxidizer-hydrator, vapor cooler and precipitator, respectively.

2. An apparatus for preparing vapors from an electric phosphate reduction furnace for treatment in an electrical precipitator to remove phosphoric acid comprising the combination of a dust separator; a vapor line from dust separator to burner of oxidizer-hydrator; combined oxidizer-hydrator comprising an enclosed U-shaped chamber, a burner at top of one column of chamber, means for maintaining aqueous spray thruout the lower portion of said column of chamber, inlets for air in bottom of chamber adjacent to bottom of the first mentioned column, means for maintaining aqueous spray thruout the other column of the chamber; a vapor line from top of last mentioned column of the U-shaped chamber to top of vertical cooling chamber; a vertical cooling chamber with means for admitting air at top; means for propelling vapors thru the dust separator, the oxidizer-hydrator and vapor cooler so that a pressure, substantially equal to the prevailing atmospheric pressure, is maintained at the vapor outlet of the furnace; and means for withdrawing liquid separating from the bottom of the oxidizer-hydrator and vapor cooler, respectively.

3. An apparatus for the combined oxidation and hydration of the phosphorus in the vapors from an electric phosphate reduction furnace comprising the combination of a combined oxidizer-hydrator comprising an enclosed U-shaped chamber, a burner at top of one column of chamber, means for maintaining aqueous spray thruout the lower portion of said column of chamber, inlets for air in bottom of chamber adjacent to bottom of the first mentioned column, means for maintaining aqueous spray thruout the other column of the chamber; a vapor line from top of last mentioned column of the U-shaped chamber to top of vertical cooling chamber; a vertical cooling chamber with means for admitting air at top; means for propelling vapors thru the oxidizer-hydrator and vapor cooler so that a pressure, substantially equal to the prevailing atmospheric pressure, is maintained at the vapor outlet of the furnace; and means for withdrawing liquid separating from the bottom of the oxidizer-hydrator and vapor cooler, respectively.

4. An apparatus for the combined oxidation and hydration of elemental phosphorus comprising the combination of a combined oxidizer-hydrator comprising an enclosed U-shaped chamber, a burner at top of one column of chamber, means for maintaining aqueous spray thruout the lower portion of said column of chamber, inlets for air in bottom of chamber adjacent to bottom of the first mentioned column, means for maintaining aqueous spray thruout the other column of the chamber; a vapor line from top of last mentioned column of the U-shaped chamber to top of vertical cooling chamber; a vertical cooling chamber with means for admitting air at top; means for propelling vapors thru the oxidizer-hydrator and vapor cooler so that a pressure, substantially equal to the prevailing atmospheric pressure, is maintained at the vapor outlet of the furnace; and means for withdrawing liquid separating from the bottom of the oxidizer-hydrator and vapor cooler, respectively.

5. An apparatus for the combined oxidation and hydration of elemental phosphorus comprising the combination of a combined oxidizer-hydrator comprising an enclosed U-shaped chamber, a burner at top of one column of chamber, means for maintaining aqueous spray thruout the lower portion of said column of chamber, means for maintaining aqueous spray thruout the other column of the chamber; a vapor line from top of last mentioned column of the U-shaped chamber to top of vertical cooling chamber; a vertical cooling chamber with means for admitting air at top; means for propelling vapors thru the oxidizer-hydrator and vapor cooler so that a pressure, substantially equal to the prevailing atmospheric pressure, is maintained at the vapor outlet of the furnace; and means for withdrawing liquid separating from the bottom of the oxidizer-hydrator and vapor cooler, respectively.

HARRY A. CURTIS.

CERTIFICATE OF CORRECTION.

January 7, 1936.

Patent No. 2,026,519.

HARRY A. CURTIS.

It is hereby certified that error appears in the printed specification of the above numbered patent requiring correction as follows: Page 2, first column, line 24, for "combination" read combustion; and that the said Letters Patent should be read with this correction therein that the same may conform to the record of the case in the Patent Office.

Signed and sealed this 3rd day March, A. D. 1936.

Leslie Frazer

Acting Commissioner of Patents.

(Seal)